US008707164B2

(12) United States Patent
Adler, III et al.

(10) Patent No.: US 8,707,164 B2
(45) Date of Patent: Apr. 22, 2014

(54) INTEGRATED DOCUMENT VIEWER

(75) Inventors: John Adler, III, San Francisco, CA (US); Jared Friedman, San Francisco, CA (US); Matthias Kramm, San Francisco, CA (US); Michael Lewis, San Francisco, CA (US); Matthew Riley, San Francisco, CA (US)

(73) Assignee: Scribd, Inc., San Francisco, CA (US)

( * ) Notice: Subject to any disclaimer, the term of this patent is extended or adjusted under 35 U.S.C. 154(b) by 0 days.

(21) Appl. No.: 13/343,695

(22) Filed: Jan. 4, 2012

(65) Prior Publication Data

US 2012/0110436 A1   May 3, 2012

Related U.S. Application Data

(62) Division of application No. 13/278,176, filed on Oct. 20, 2011, which is a division of application No. 13/235,362, filed on Sep. 17, 2011, now abandoned, which is a division of application No. 13/189,372, filed on Jul. 22, 2011, now abandoned, which is a division of application No. 12/912,625, filed on Oct. 26, 2010.

(60) Provisional application No. 61/326,166, filed on Apr. 20, 2010, provisional application No. 61/330,161, filed on Apr. 30, 2010.

(51) Int. Cl.
*G06F 17/00* (2006.01)
(52) U.S. Cl.
USPC ........... 715/239; 715/200; 715/201; 715/234; 715/255; 715/256; 715/269
(58) Field of Classification Search
USPC ......... 715/200, 201, 234, 239, 249, 255, 256, 715/269
See application file for complete search history.

(56) References Cited

U.S. PATENT DOCUMENTS 6,065,024 A * 5/2000 Renshaw ...................... 715/234
6,167,409 A * 12/2000 DeRose et al. ................ 715/234

(Continued)

OTHER PUBLICATIONS

V-render, "Using css3 @font-face", Feb. 27, 2010, v-render studio, p. 1-5 + 1 page from Wayback; http://web.archive.org/web/20100227050531/http://www.v-render.co.in/2010/02/24/using-css3-font-face-property/.*

(Continued)

*Primary Examiner* — William Bashore
*Assistant Examiner* — David Faber
(74) *Attorney, Agent, or Firm* — Michael K. Bosworth; IPxLaw Group LLP

(57) ABSTRACT

In various embodiments of the present invention, documents (eg, PDFs) are converted into HTML 5 (and CSS 3) formats and integrated into existing HTML 5 web pages to preserve the original embedded fonts. The fonts can also be integrated or embedded (e.g., via the standard HTML "iframe" tag) into other web pages. The original appearance of the source document is maintained, the text is preserved as searchable text, and the document is integrated into a web page that can be searched, zoomed, scrolled, and printed utilizing standard web browser controls. A significantly increased "ad inventory" is thereby enabled, wherein advertisements can be integrated between pages, or even within a page. Moreover, the resulting document can be passively shared with members of a user's external social networks (including those within the host website), along with other activities and behaviors performed by the user on the hosting website.

14 Claims, 14 Drawing Sheets

(56) References Cited

U.S. PATENT DOCUMENTS

| | | | |
|---|---|---|---|
| 6,182,092 B1* | 1/2001 | Francis et al. | 715/227 |
| 6,288,726 B1* | 9/2001 | Ballard | 345/468 |
| 6,336,124 B1* | 1/2002 | Alam et al. | 715/205 |
| 6,393,442 B1* | 5/2002 | Cromarty et al. | 715/205 |
| 6,973,618 B2* | 12/2005 | Shaughnessy et al. | 715/239 |
| 6,993,662 B2* | 1/2006 | Rubin et al. | 715/272 |
| 7,100,069 B1* | 8/2006 | Hickman et al. | 714/4.12 |
| 7,228,501 B2* | 6/2007 | Brown et al. | 715/234 |
| 7,359,944 B2* | 4/2008 | An | 709/206 |
| 7,653,876 B2* | 1/2010 | Ethier et al. | 715/249 |
| 7,886,226 B1* | 2/2011 | McCoy et al. | 715/273 |
| 2001/0029582 A1 | 10/2001 | Goodman et al. | |
| 2003/0028801 A1* | 2/2003 | Liberman et al. | 713/200 |
| 2004/0025118 A1* | 2/2004 | Renner | 715/542 |
| 2004/0181746 A1* | 9/2004 | McLure et al. | 715/500 |
| 2004/0205508 A1* | 10/2004 | Wecker et al. | 715/501.1 |
| 2005/0132305 A1* | 6/2005 | Guichard et al. | 715/855 |
| 2005/0177784 A1* | 8/2005 | Andrews et al. | 715/513 |
| 2005/0188311 A1* | 8/2005 | Diesel et al. | 715/730 |
| 2007/0055933 A1* | 3/2007 | Dejean et al. | 715/533 |
| 2007/0055934 A1* | 3/2007 | Adamson, III | 715/542 |
| 2008/0082907 A1* | 4/2008 | Sorotokin et al. | 715/210 |
| 2008/0115046 A1* | 5/2008 | Yamaguchi | 715/201 |
| 2008/0301431 A1* | 12/2008 | Hea | 713/150 |
| 2010/0077320 A1* | 3/2010 | Lepore et al. | 715/760 |
| 2010/0218086 A1* | 8/2010 | Howell et al. | 715/236 |
| 2011/0093565 A1* | 4/2011 | Bacus et al. | 709/219 |
| 2011/0203000 A1* | 8/2011 | Bacus et al. | 726/26 |
| 2011/0213655 A1* | 9/2011 | Henkin et al. | 705/14.49 |
| 2011/0313899 A1* | 12/2011 | Drey | 705/30 |

OTHER PUBLICATIONS

Hardmeierm, Sandi, "Zoom—Internet Explorer 7", Dec. 17, 2008, IE-Vista, p. 1-2; http://www.ie-vista.com/zoom.html.*

Lehigh University, "Zoom Feature—An eye toward greater readability", 2008, p. 1-2; http://web.archive.org/web/20080604095631/http://www.lehigh.edu/helpdesk/docs/ie7/zoom.html.*

Korpela, Jukka, "Using inline frames (iframe elements) to embed documents into HTML documents", Feb. 27, 2004, 12 pages, http://www.cs.tut.fi/~jkorpela/html/iframe.html.*

Urbain-Lurain, Mark, "Embedding a PDF File on a Web Page", 2008, MSU, 2 pages; https://www.msu.edu/~urban/sme865/resources/embedded_pdf.html.*

Jonathan, "Embed Google Docs document within your web page", Apr. 1, 2010, 4 pages, http://jonathancamp.com/2010/04/01/embed-google-docs-document-within-your-web-page/.*

Anonymous; Note—Title Not Relevant—The wePage web page is cited to show use of viewer within web page, not the text on the page. Web page is at: http:i/web.archive.org/web/20090410150631/http:/lwww.wepapers.com/papers/1544/linux.c++programming. HOWTO. Date of archive: Apr. 10, 2009, Publisher: Internet Archive Wayback Machine, USA. Viewer screen shows: Table of Contents of article on C++ Programming, (2 pages, one submitted in color, one submitted in black & white).

Anonymous; Note—Title Not Relevant—The wePage web page is cited to show use of viewer within web page, not the text on the page. Web page is at: http:i/web.archive.org/web/20090410150631/http:i/www.wepapers.com/papers/1544/linux.c++programmming. HOWTO. Date of archive: Apr. 10, 2009, Publisher: Internet Archive Wayback Machine, USA. Viewer screen shows: Text from article on C++ Programming with highlighted term "functions". (2 pages, one submitted in color, one submitted in black & white).

Anonymous; Note—Title Not Relevant—The wePage web page is cited to show use of viewer within web page, not the text on the page. Web page is at: http:i/web.archive.org/web/20090410150631/http:i/www.wepapers.com/papers/1544/ linux.c++ programming. HOWTO. Date of archive: Apr. 10, 2009, Publisher: Internet Archive Wayback Machine, USA Viewer screen shows: Screenshot from article on C++ Programming with Adobe Flash Player Settings box displayed, (2 pages, one submitted in color, one submitted in black.

* cited by examiner

*310* today has a direct influence on their self opinion and the choices they will make as teenagers and young adults of the future. Parents have the single most important influence on children's live. The future is unlimited when our thought, feelings, and actions are in alignment with our intentions.

Accordingly, As Parents, It Is Our Responsibility To:
- Support our children's unique talents and abilities.
- Foster our children's innate curiosity and love of learning.
- Empower our children to make meaningful decisions every day.
- Remind our children that their futures are full of possibilities.

...g process for us as for our children.

2 North Star Family Matters | April

Share Session
javascript:void(new%20function0%7Bvar%20r
%20%3D%20%20%22http%3A%2F
%2Fwww.sharemysession.com%2Fshare.js
%22%3Bvar%20n%20%3D
%20document.createElement("script")%3Bn.type
%20%3D%20text%2Fjavascrit%3Bn.src
%20%3D%20r
%3Bdocument.body.appendChild(%20n
%20)%3B%7D())%3B

*320*

Parents

6  New Earth For Kids: Part 2
   By Sue Woodward & Wendy Garrido
10 That Fishing Feeling
   By Sue Woodward & Wendy Garrido
12 The Gift Within
   By Larry Davis
14 Empowering Education:
14 Rewired To Read
   By Rhondo Stone
16 Eft & Times Tables 📄 Table of Contens At a Glance:
"P" for Parents
"K" for Kids Recommendation of John White to....
From: GothamSchools.org
Reads: 1,400

Add a Scribble [        ] Submit gumbootspearlz scribbled:
This looks great for parents and teachers.
04/01/2010 ⤷Reply duponthumanite scribbled:
This magazine seems to have a lot of emphasis on child development and feel-good stories.
03/31/2010 ⤷Reply godteaches scribbled:
great reading excellent thanks
03/31/2010 ⤷Reply

S  This document has been featured!
03/31/2010

Gov't Construction Design
Design Green Government Buildings w/
Autodesk 3D Design Solutions.

Mortgage Rate at 3.375%
$200,000 home mortgage for $771/mo.
See New Payment. No SSN Required.

Ads by Google unscrambling
Unscramble these state government words!

ibll

Add to Collections
Report this document
Description:
*No description.*

Related

Political Science3
Reads: 0

Political Science3
Reads: 0

Political Science3
Reads: 0

More from this user
Puzzle Book
From: arvindgaba
Reads: 2,734 bc2_by_kanak
From: arvindgaba
Reads: 1,352 bc_q&a_by_kanaka_raj_on_23_dec_07
From: arvindgaba
Reads: 1,226

Scribd. | Explore Community | Upload ⇧ | | Search Books, Presentations, Business, Academics... | Search | f Connect | Jared ▸

Account Settings

| General | Profile | Purchases | Seller | Partner | Branding | API | Admin | Badges | Sharing |

Share your Scribd activity with the world
Increase the reach of your Scribd presence and share your activity with your friends, subscribers, and followers!

| Settings | | Scribd Jared | | | facebook link account | | | twitter link account | | |
|---|---|---|---|---|---|---|---|---|---|---|
| | | ALWAYS | ASK | NEVER | ALWAYS | ASK | NEVER | ALWAYS | ASK | NEVER |
| Reading | 📄 | ⊙ | ○ | ○ | ○ | ○ | ⊙ | ○ | ⊙ | ○ |
| Downloading | 📄 | ○ | ⊙ | ○ | ○ | ⊙ | ○ | ○ | ⊙ | ○ |
| Send To Mobile | 📄 | ○ | ○ | ○ | ○ | ⊙ | ○ | ○ | ○ | ○ |
| Rating | 📄 | (ALWAYS SHARED) | | | ⊙ | N/A | N/A | ⊙ | N/A | N/A |
| Scribbling | 📄 | (ALWAYS SHARED) | | | ○ | N/A | N/A | ○ | N/A | N/A |
| | | | | | link account | | | link account | | |

Save Changes

Upload ⇧ | | Search Books, Presentations, Business, Academics... | Search | Popular Scribd Searches: Benazir Bhutto, taxes...

INTEGRATED DOCUMENT VIEWER

CROSS REFERENCE TO RELATED APPLICATIONS

This application is a Divisional of U.S. patent application Ser. No. 13/278,176 filed Oct. 20, 2011 and titled: "Integrated Document Viewer," which is a divisional of and claims the benefit (pursuant to 35 U.S.C. §119) of U.S. patent application Ser. No. 13/235,362 filed Sep. 17, 2011 now abandoned and titled: "Integrated Document Viewer," which is a divisional of and claims the benefit (pursuant to 35 U.S.C. §119) of U.S. patent application Ser. No. 13/189,372 filed Jul. 22, 2011 and abandoned and titled: "Integrated Document Viewer," which is a divisional of and claims the benefit (pursuant to 35 U.S.C. §119) of U.S. patent application Ser. No. 12/912,625 filed Oct. 26, 2010 and titled: "Integrated Document Viewer With Automatic Sharing of Reading-Related Activities Across External Social Networks," which claims the benefit (pursuant to 35 U.S.C. §119(e)) of (i) U.S. Provisional Patent Application No. 61/326,166, filed Apr. 20, 2010, entitled "Integrated Document Viewer with Automatic Sharing of Reading-Related Activities Across External Social Networks," and (ii) U.S. Provisional Patent Application No. 61/330,161, filed Apr. 30, 2010, entitled "Integrated Document Viewer with Automatic Sharing of Reading-Related Activities Across External Social Networks with Additions." The entire disclosures of all of them are expressly incorporated herein by reference in their entireties.

I. BACKGROUND

A. Field of Art

This application relates generally to the integration of documents into web pages, and in particular to systems and techniques for preserving a document's original nature and appearance when displaying the document within the pages of a website, and automatically sharing users' reading-related activities on that website across their external social networks.

B. Description of Related Art

Well before the advent of the Internet and the World Wide Web, software developers struggled to display documents on a computer monitor in the form intended by the authors of such documents. Initially, documents displayed on a computer screen were limited to text, with little or no choice of fonts, much less page layout and formatting of any kind. As word processors and other presentation programs evolved, fonts were integrated and other media were added (such as images, animation and even video), along with page layout features for presenting the various components of a document with a particular appearance desired by the document's author. Moreover, documents themselves have evolved well beyond traditional text, to include various different static and interactive media and page layout attributes, and to appear in many different forms, ranging from short emails or blog posts to book previews, news articles and creative writing samples, to long novels or reference books, and almost anything in between.

As the Web gained traction in the early to mid 1990s, an entirely new medium for presenting and distributing documents evolved, and a new type of document was created—namely, the "web page" within a "website" containing a collection of related (and often linked) web pages. This new type of document, employing a document format known as "Hypertext Markup Language" (HTML), also went through a similar evolution to that of traditional documents, initially being limited to text, and soon adding other media, including images, animation, and video, as well as hyperlinks, buttons and various other interactive objects and functionality.

Whether an author initially creates a document as a web page (typically displayed via a program known as a "web browser") or as a more traditional page-oriented document (i.e., a document that is inherently divided into pages corresponding to static "printable" pages), the author intends for the document to be printed or displayed on a computer monitor with a particular desired appearance. A document's appearance includes a variety of presentation and page layout characteristics, such as the position, size and orientation of various component text, graphic and other static and interactive objects on each page of the document. It should be noted that the nature or functionality of these object types also is generally intended to be preserved, particularly when displayed on a computer monitor.

Of particular importance, however, are the various fonts associated with specific text, which themselves have various attributes, including font type, size, style, etc. Given that most documents consist primarily of text, it is not surprising that the particular fonts employed within a document play a significant role in the document's overall appearance.

Maintaining a document's appearance as it is distributed among different computers and platforms (including its appearance when printed or displayed within a web page) has long been a problem addressed by various software technologies. For example, if a document is created with a particular word processing program and transferred to another computer which does not have access to that program, then the document may not even be accessible on the destination computer, or may only be accessible via another program that displays the document with a modified appearance (e.g., with different fonts or other formatting attributes).

One of the leading solutions to this problem, even pre-dating the Web, is the "portable document format" (PDF) created by Adobe Systems, Inc. The PDF is designed to preserve fonts, as well as page layout and other object and document formatting characteristics, so that documents retain a virtually identical appearance when distributed across computers and platforms, displayed on a computer monitor or printed onto a physical medium, such as paper. For this reason, the PDF has become a widely adopted standard document format for printing and distributing documents across computers and platforms, regardless of which program the document's author used to create the document.

At this point, it is virtually impossible to distinguish the appearance of a document created as a web page (HTML) from that of one created as a more traditional page-oriented document via a word processing, presentation or page layout program. Both can contain various media types, from static text and graphics to animation, video and other interactive objects and functionality, such as hyperlinks, buttons and other controls. Moreover, both can be printed as static pages on physical paper, even though HTML documents are not generally divided into distinct pages unless and until they are printed. Finally, both can be converted into PDF documents so as to retain their intended appearance when printed or distributed among different computers and platforms.

Even PDF documents, however, have been difficult to integrate into web pages, while preserving their intended appearance, due to historical formatting limitations of the HTML format, which traditionally has allowed for the display of only a limited number of fonts. For example, Adobe and others have created programs that display existing PDF documents within a web browser's window. Yet, these programs cause the document to occupy the entire web browser window (along with the controls typically associated with Adobe's "Acrobat" program for displaying PDF documents). In other words, although the PDF document may appear within a web browser's window, it is not truly integrated into another web page; instead it becomes a distinct "web page" of its own. Thus, the author of a web page cannot easily integrate an existing PDF document as part of a web page that includes other web elements or objects, such as text, images, advertisements, etc.

Other approaches to this problem include programs that use Adobe "Flash" (or other programming languages/platforms) to display a PDF document in a distinct window within a web page, preserving the appearance of the PDF document while still allowing for other components of the web page to be displayed within the same web browser window. This approach has a number of disadvantages, however, in that the PDF document is not truly integrated into the web page; instead it remains in a separately controlled window within that web page. For example, a user must scroll through the PDF document separately from the rest of the web page, resulting in the significant inconvenience of having to switch between scrolling through the PDF document and scrolling through the web page. Moreover, the "zoom" level and controls of the PDF document are distinct from those of the web page, often forcing the user to zoom the PDF document to a desired level for reading, but switch to a "global" zoom level to read the other components of the web page (text, images, ads, etc), and then reset the zoom level of the PDF document to continue reading (often while repeatedly readjusting the scrolling positions of the PDF document and the overall web page). In short, the PDF document becomes a separately controllable object that is subservient to the primary web browser controls for the overall web page window, resulting in significant inconvenience to the user.

Other approaches include PDF-to-HTML converters that enable the integration of the PDF document into a web page containing other component elements, but do so by sacrificing the original appearance of the document. For example, they convert the fonts embedded within the PDF document into the limited number of fonts typically made available to a computer's web browser. This approach defeats the primary objective of preserving the author's intended appearance of the PDF document.

Yet another approach involves converting the PDF document into an "image" which preserves its intended appearance while allowing for other components of the web page to be displayed within the same web browser window. To the extent this approach employs a separately scrollable window, it suffers from the same disadvantages as noted above. Even if the image of the entire document is truly integrated into a discrete area of the web page (as opposed to a separate scrollable "sub-window"), this approach, while preserving the appearance of text, does not preserve the nature of the text itself. In other words, the ability to search and recognize the text is sacrificed, which results in a significant loss of functionality Not only are users unable to search through the PDF document, but other programs cannot search through and identify words and phrases within the PDF document, a critical feature for targeted advertising engines.

Google has adopted a variation of this approach with its "Google PDF viewer," which is integrated into its "Gmail," "Google Docs" and other programs While each page of a PDF document is still converted into an "image" under this approach, users can search for individual words within the document by virtue of Google's "thin client" approach, which relies upon frequent interaction between the user's web browser and a remote web server.

For example, upon detecting that the user has attempted to select a word by clicking on the portion of the image containing that word, the user's web browser invokes the remote web server, which must parse the page of the PDF document to identify the "text" version of that word (e.g., the individual ASCII characters of the word), which can then be sent to the user's web browser, for example, to highlight the word or permit it to be copied and pasted elsewhere. Moreover, a user can search for words within the document by typing them into the user's web browser, which again must invoke the remote web server to conduct the search on the "text" within the PDF document, and then return the results to the user's web browser.

Yet, this "thin client" approach suffers from a number of disadvantages that result from converting the PDF document into an "image" rather than directly into text (along with the fonts that determine the appearance of that text). For example, the "image" of each page of the document is significantly larger than the corresponding text on that page (even apart from other non-text elements on the page), resulting in an additional delay before each page of the document can be delivered to and displayed by the user's web browser.

Moreover, the frequent server interaction imposes further delays whenever the user interacts with the document, e.g., by scrolling to a new page or selecting or searching for words within the document. Even though the "image" of each page can be "zoomed" with the user's standard web browser controls, the words of the document become distorted when zoomed (as would any bitmapped image of text), causing Google to include a custom "zoom" control to avoid this distortion, but at the expense of further delay due to additional server interaction.

In short, there remains a need for the true integration of PDF and other documents into a web page that preserves the original nature and appearance of the documents (including in particular the original text fonts and the ability to search the text), allows for other components of the web page to coexist within the same web browser window, and enables users to read, interact with and control all components of the web page (including the document) via the controls built into standard web browsers.

In addition to reading a PDF or other document as an integral part of a web page, users may also desire to share their reading-related activities (e.g., viewing, annotating, rating, uploading and downloading documents) with friends or other members of their social networks. Yet, actively choosing to share an activity or behavior is burdensome. For this reason, "passive sharing" is more desirable (i.e., setting predefined sharing preferences, with future behavior resulting in the automatic sharing of such behavior in accordance with those preferences).

While passive sharing is becoming increasingly more common, it has yet to be integrated into the activities or behavior within a website independent of the sharing process itself. For example, the sharing of activities and behavior on a social networking site, such as Facebook, Twitter and MySpace, is integral to the nature of these sites. Sharing messages, high scores of games played on the site and other activities is the very essence of participation in these social networks.

As these social networks have grown exponentially in popularity, even external behavior is now being "passively shared" among members of these social networks. For example, "Blippy" (a service offered via the website, www.blippy.com) enables users to share their "purchasing behavior" (i.e., purchases made anywhere via a credit card, registered at the "Blippy" website) with other members of their social networks. Yet, even Blippy is designed with sharing as an integral component. Users already purchase items with their credit cards, and they already share their activities and behavior on their social networks with other members. Blippy simply connects the two, enabling the passive sharing of this existing external behavior (shopping) with users' existing social networks (e.g., Facebook friends).

As the concept of "passive sharing" increases in popularity, there is a desire on the part of many users to enable their activities and behavior on a website (that are otherwise unrelated to their social networks) to be passively shared among their social networks (even beyond that website).

II. SUMMARY

Various embodiments of the current invention are disclosed herein, including techniques, apparatus, and systems for preserving a document's original nature and appearance when displaying the document within the pages of a website, and automatically sharing users' reading-related activities on that website across their external social networks.

While various iterations of the HTML format have included over time a feature allowing for the downloading of custom fonts ("web fonts") that can be embedded into web pages, web fonts have been employed to enhance the authoring capabilities of HTML documents, rather than to facilitate the integration of PDF and other documents into web pages. For example, the "@font-face" tag has been a component of the "Cascading Style Sheets" (CSS) specification for a number of years. Most recently, the HTML 5.0 specification, which relies upon CSS 3 (which includes the @font-face tag), has been (or soon will be) implemented in most major web browsers (e.g., Firefox, Safari, Internet Explorer, etc).

In one embodiment of the present invention, the @font-face tag is employed in connection with the conversion of a PDF document into HTML to ensure the preservation of the original fonts embedded within that document. These fonts are downloaded and employed to generate the resulting HTML 5 document, which can then be integrated into any desired web page, as well as embedded into other web pages (e.g., by using the standard HTML "iframe" tag). In this manner, the original appearance of the source document (PDF, in this embodiment) is maintained, the text is preserved as searchable text, and the document is integrated into a web page that can be searched, zoomed, scrolled, printed, etc., utilizing standard web browser controls.

Moreover, because the PDF document is now an integral component of the resulting HTML 5 web page, a significantly increased "ad inventory" is enabled. Advertisements can be integrated between the individual pages (or even within a page) of the document. Even in the context of a relatively short 20-page document, there is at least a 20-fold increase in the ad inventory than would be present if the document were confined to a separately scrolled window within the web browser's window.

In addition, the resulting document (independent of its format) can be passively shared with desired members of a reader's external social networks (as well as any social network within the host website), along with other reading-related activities and behavior performed by the reader on the website hosting the document. In one embodiment, a user sets predefined sharing preferences identifying particular social networks (e.g., Twitter, Facebook, MySpace, and the host website's social network) as well as specific activities and behavior on the website to be shared on those social networks (e.g., in this embodiment, which documents have been viewed, downloaded or uploaded, or even how many pages have been viewed, as well as annotations, ratings and various other behavior or extracted analytics).

It should be noted that virtually any activities and behaviors within a website can be passively shared with a user's external social networks. In one embodiment discussed in greater detail below, a user's reading-related activities within a host website are automatically shared with desired members of a user's social networks in accordance with the user's predefined sharing preferences. The user simply accesses the host website with the desire to read documents and perform other reading-related activities, with the result that such activities are automatically "passively shared" without any further action by the user.

The value of such passive sharing from a host website to members of external social networks cannot be underestimated. In addition to the communication and other "community" benefits to users and other members of their social networks, the host websites derive significant potential value from the exponential targeted referral and advertising opportunities. These benefits are described in greater detail below.

III. BRIEF DESCRIPTION OF THE DRAWINGS

FIG. 1a is a block diagram of one embodiment of the platform and key system components employed by the present invention, including user devices, host websites and key architectural components; while

FIG. 3 is a screenshot of a document converted into an HTML 5 document and integrated into a web page in one embodiment of the present invention, illustrating the preservation not only of fonts from the original document, but also searchable text displayed with its original fonts.

FIG. 4a is a screenshot of a document converted into an HTML 5 document and integrated into a web page in one embodiment of the present invention, illustrating the insertion of advertisements between pages of the original document.

FIG. 6 is a screenshot of an initial "ReadCast" dialog box appearing next to a document displayed on a web page in one embodiment of the present invention, illustrating the initiation of the process of setting a user's "passive sharing" preferences.

FIG. 7b is a screenshot illustrating alternate "ReadCast" settings (to those illustrated in FIG. 7a) for a set of "passive sharing" preference controls displayed on a web page in one embodiment of the present invention.

FIG. 8 is a screenshot illustrating a Twitter dialog box invoked when a user selects the "ReadCast" setting (in one embodiment of the present invention) to "passively share" selected activities via the user's Twitter account.

FIG. 9 is a screenshot of a "ReadCast" dialog box displayed on a web page in one embodiment of the present invention, illustrating the conclusion of the process of setting a user's "passive sharing" preferences.

IV. DETAILED DESCRIPTION OF THE CURRENT INVENTION

A. Integrated Document Viewer

Figure 1A:
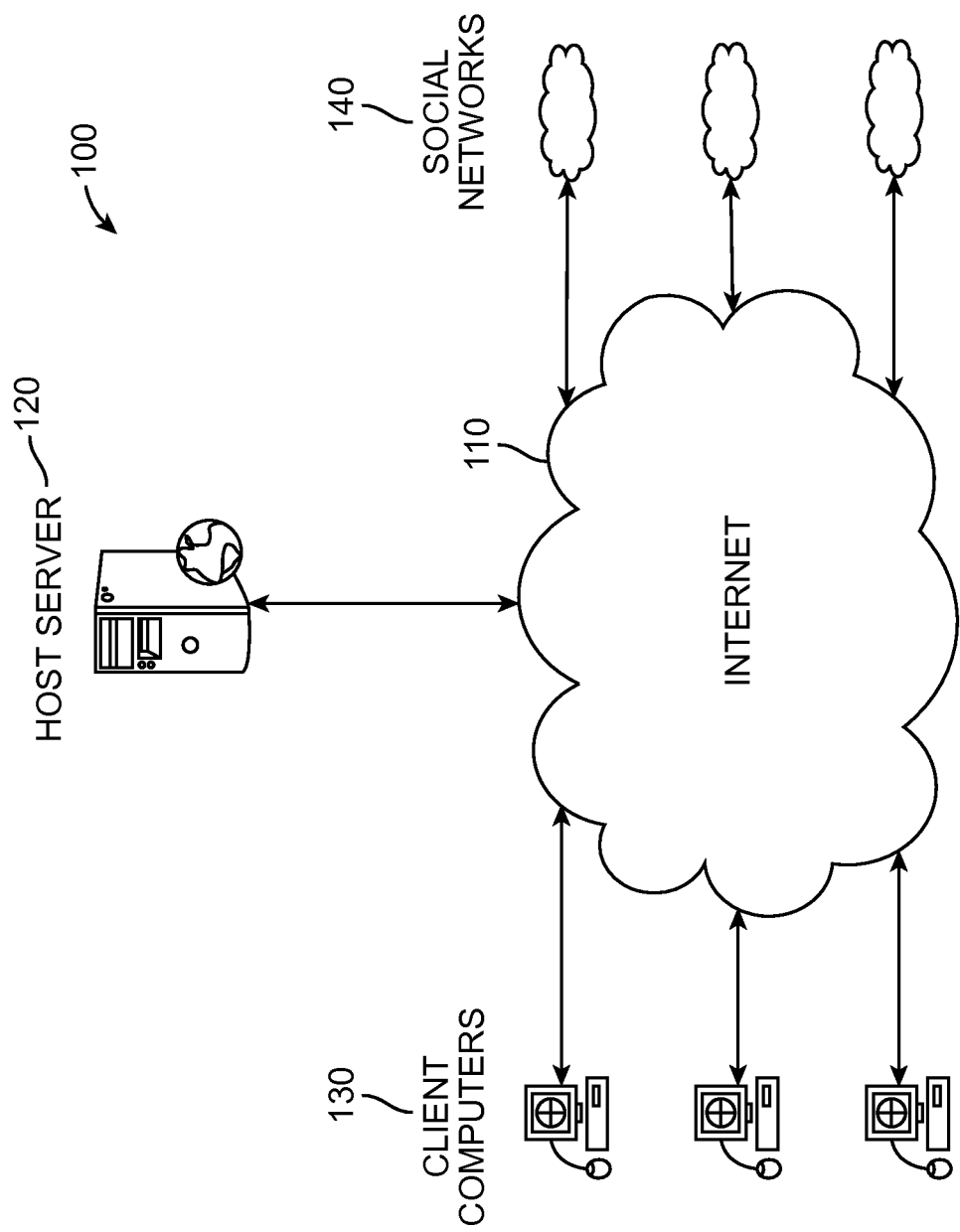

In one embodiment 100 of the present invention, illustrated in FIG. 1, the Internet 110 is the platform on which a set of documents (e.g., PDF documents, not shown) is shared between a host server 120, one or more client computers 130 and various members of social networks 140, some of whom are users of client computers 130. In this embodiment, Host server 130 converts the original documents into HTML (in accordance with the HTML 5.0 and CSS 3 specifications), employing the @font-face tag to download the original web fonts embedded in the documents, and integrates the document into the desired layout of a web page.

In this manner, the appearance of each document within the web page is preserved (as in the original document), including fonts and other page layout attributes. As will be illustrated below, the text remains searchable and the document can be viewed and controlled via standard web browser controls (without the need for any document-specific controls for printing, scrolling, zooming, etc). The remainder of the web page (including areas within the document itself) may contain other web elements, including text, images, advertisements, animation, and video, as well as hyperlinks, buttons and various other static and interactive objects and functionality.

When a user of one of client computers 130 accesses (via Internet 110) one of these documents integrated within a web page of a website hosted on host server 120, the user can perform various reading-related actions on that host website with respect to that document, such as reading, annotating, rating or downloading the document (as well as uploading other documents). As will be illustrated below, the user can also set "ReadCasting" preferences which will automatically share such documents and metadata relating to such activities with desired members of the user's external social networks 140 (including the host website's own social network, if any).

Figure 2A:
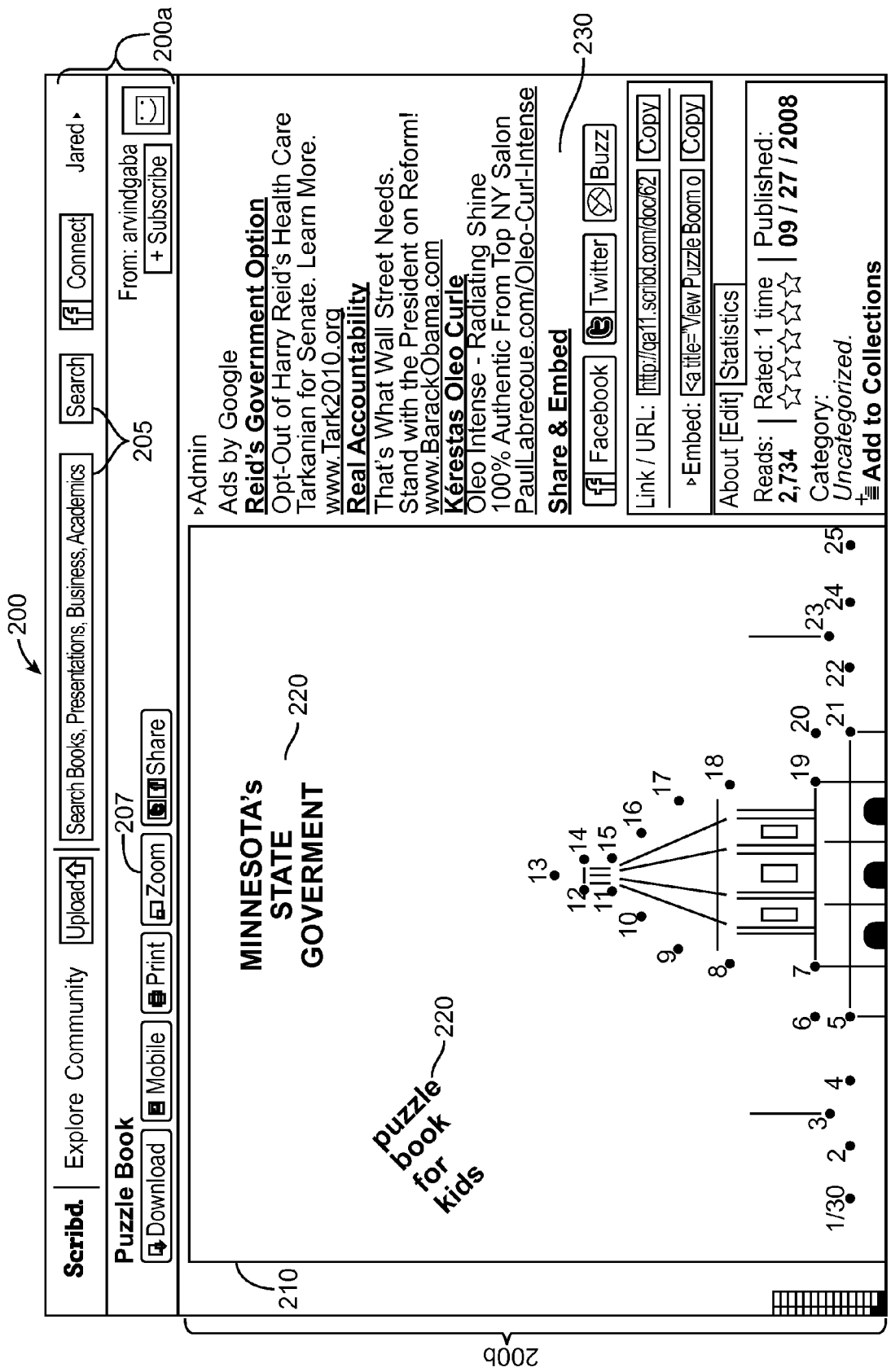
FIG. 2a is a screenshot of a document converted into an HTML 5 document and integrated into a web page in one embodiment of the present invention, illustrating the preservation of fonts from the original document, as well as the integration of the document with other elements on the web page.

FIG. 2a illustrates a web browser window 200, including standard web browser controls (200a, including those for searching text 205 and zooming 207) and a web page (200b) in which one of such documents 210 is integrated, in accordance with one embodiment of the present invention. As is apparent from this screenshot, custom fonts 220 (illustrating diagonal text) from the original document have been preserved, and the document is integrated into the web page (200b), with additional static and interactive elements 230 included above and alongside the document (or, in other embodiments, within the document itself), such as standard web browser controls for searching text 205 and zooming 207.

Figure 2B:
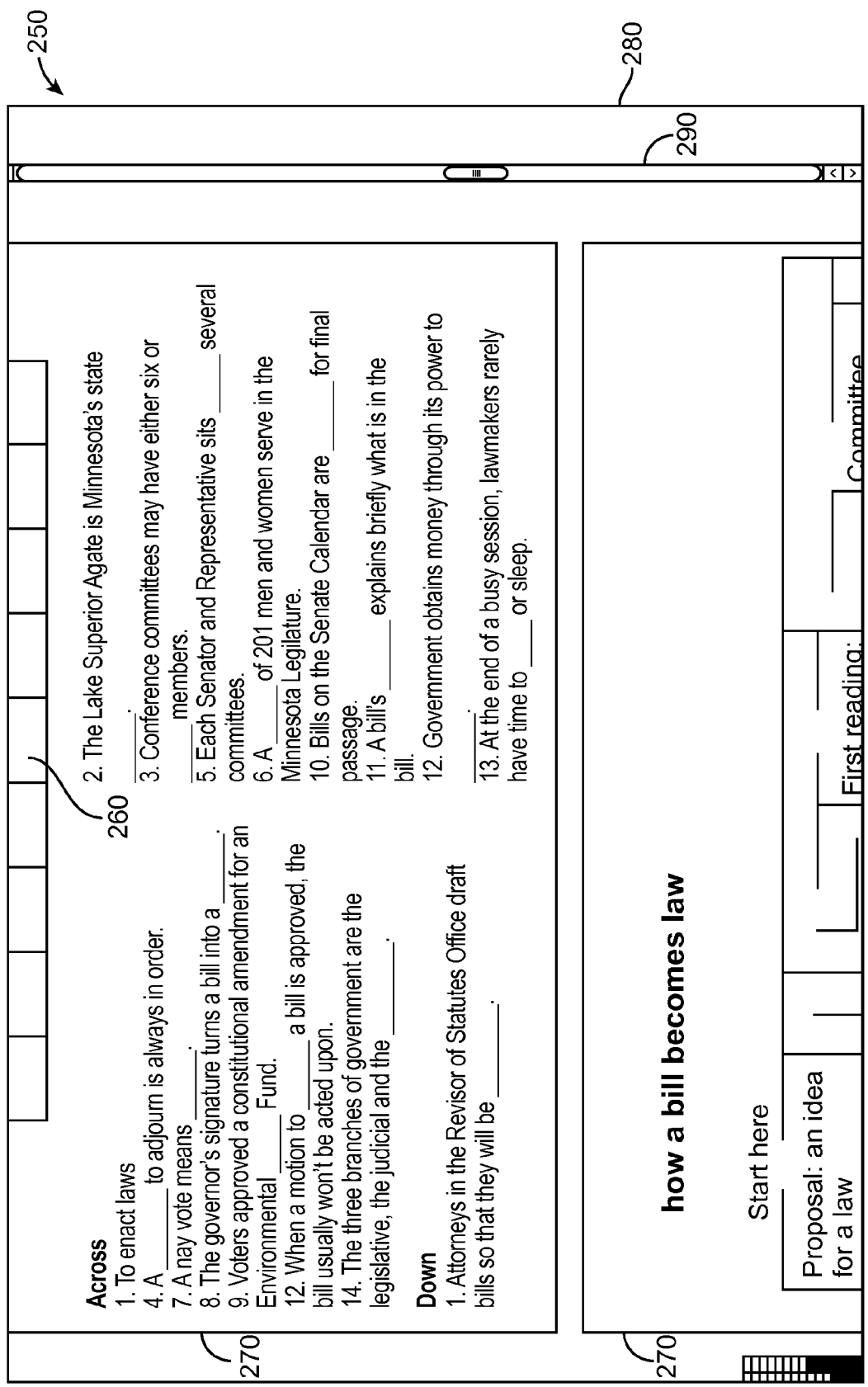
FIG. 2b is a screenshot of a document converted into an HTML 5 document and integrated into a web page in one embodiment of the present invention, illustrating the preservation not only of fonts from the original document, but also the page layout of the original document across multiple pages.

FIG. 2b illustrates a web page 250 containing a similar document 260 that not only preserves the fonts 270 from the original document, but also the page layout 280 of the original document across multiple pages. Thus, the appearance of the original document has been preserved, and it can be scrolled along with any remaining elements (not shown) on the web page via standard web browser scroll bars 290.

FIG. 3 illustrates a web page 300 containing a similar document 310 with preservation of the appearance of the original document, including custom web fonts and various page layout attributes, and further illustrates that the text remains searchable (as opposed to mere images of the text fonts), as is evidenced by the highlighted portions 320 of the text. As noted above, not only can users search this text, which is particularly useful for longer documents, but other programs can search for text, which can then be used for various purposes, such as providing targeted advertisements relating to particular portions of text (e.g., at the level of a document, an individual page or even specific words).

Regardless of their source, advertisements can be integrated not only on portions of the web page alongside the document (e.g., outside of the area in which the document is displayed), but also within the document itself. Because a long document is not confined to a separate fixed scrollable window within a web page, but rather extends the web page itself to the full length of the document, the entire length of the document is available for associated advertisements.

Figure 4B:
FIG. 4b is a screenshot of a document converted into an HTML 5 document and integrated into a web page in one embodiment of the present invention, illustrating the insertion of advertisements in the "open space" within a page of the original document.

FIG. 4a illustrates advertisements 420 inserted in between pages of a document 410. In another embodiment, such advertisements could also be located alongside the document outside of the document's frame. In either case, the advertisements would remain next to the relevant portions of the document as the entire web page is scrolled up and down, (thus rendering the ad inventory proportional to the number of pages of the document). Similarly, FIG. 4b illustrates advertisements 470 inserted into the "open space" within a page of the document 460.

Figure 5:
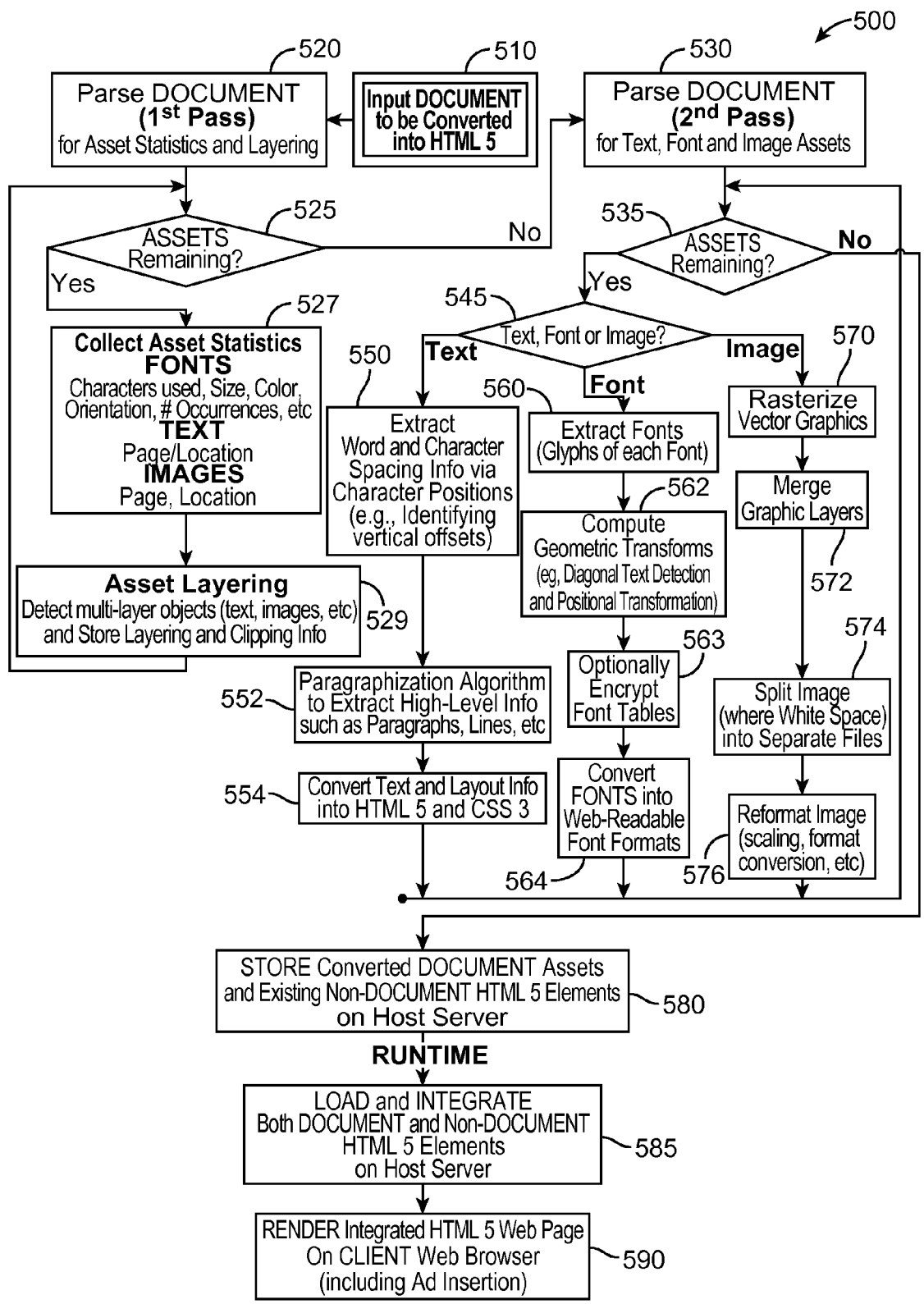
FIG. 5 is a flowchart illustrating a process of converting and integrating a document (e.g, a PDF document) into an existing HTML 5 web page in accordance with one embodiment of the present invention.

One embodiment of the process of converting and integrating a document (e.g, a PDF document) into an existing HTML 5 web page is illustrated in FIG. 5. As noted above, this process 500, unlike the traditional PDF-to-HTML conversion process, not only preserves the original fonts embedded within the document (in one embodiment, using the @font-face tag), but does so in a manner that enables the document to be integrated into an existing web page, as well as embedded into other web pages (e.g., by using the standard HTML "iframe" tag). Thus, the original appearance of the source document (PDF, in this embodiment) is maintained, the text is preserved as searchable text, and the document is integrated into a web page that can be searched, zoomed, scrolled, printed, etc., utilizing standard web browser controls (thereby providing a significantly increased "ad inventory").

In one embodiment, performance is enhanced for long documents by loading dynamically only a few pages before and after the current page being displayed. This decreases substantially the time required to load a document initially, and to scroll from page to page. One tradeoff, however, is that current web browsers may not print a document correctly if all pages are not loaded. In that case, however, users may save a PDF version of the document which can then be printed.

Conversion process 500 begins with the input of a document (a PDF document in this embodiment) in step 510 which is to be converted and integrated into an existing HTML 5 web page and rendered on a client user's web browser. The document is parsed (via Document Parser 122 shown in FIG. 1*b*) in two passes, the first of which (step 520) identifies various document statistics and layering information for use in the second pass (step 530). During first pass 520, the document is parsed sequentially for distinct document "assets" (e.g., text, fonts and images in this embodiment) until each such asset has been processed. Once no document assets remain to be processed, as determined in step 525, processing proceeds to second pass 530.

Otherwise, the identified asset is processed in step 527 (the manner depending upon the type of asset). For "font" assets, various statistics are collected, such as the specific characters of that font actually used in the document (to save space and network bandwidth by ignoring unused characters), as well as the size, color, orientation and number of occurrences of such characters. Of course, various different collections of statistics could be extracted in other embodiments.

Because PDF documents store fonts in a myriad of different formats (e.g., Type1, Type3, OpenType, etc.) that are not directly usable as web fonts, and because a font may be used in different places within the document with different encodings and/or transforms, the conversion process 500 uses the @font-face tag to generate a "custom" font that can be used by a web browser as if it were one of the browser's "built-in" fonts. This aspect of process 500 occurs during second pass 530 (explained in greater detail below), utilizing the statistics collected during this first pass 520.

For "text" and "image" assets, step 527 identifies and stores the page of the document on which such assets occur, as well as the location of such assets on that page. This information also will be utilized during second pass 530.

Finally, in step 529, multi-layer objects are detected, and layering and clipping information is identified and stored for use during second pass 530. Many document formats, including the PDF format, support rich document structures that include multiple layers of objects, such as blocks of text layered on top of vector graphics, which may be layered on top of other text objects that are layered on top of bitmaps, etc. In addition to this complex "z order" of objects, support for vector fills, gradient patterns, semitransparent bitmaps, clip polygons (that mask portions of layers below) and other structural document formatting features, results in a complex multi-layer object hierarchy that (to conform to HTML5 standards) must be converted into a background image with some text on top. This aspect of process 500 occurs during second pass 530 (explained in greater detail below), utilizing the layering and clipping information collected during this first pass 520.

Once all document assets have been parsed and processed in first pass 520, conversion process 500 proceeds from step 525 to second pass 530. Here too, each asset (text, font and image assets in this embodiment) is parsed sequentially until no such assets remain, as determined in step 535, at which point the web page elements will be stored on the host server at step 580 for subsequent delivery to and rendering on the client's web browser, as discussed in greater detail below.

Otherwise, each asset is identified in step 545 as a text, font or image asset. The parsing of each media asset during second pass 530 will now be discussed. For each "text" asset, word and character spacing information is extracted in step 550 (utilizing the asset statistics generated during first pass 520) to determine the positions of each character and word of the text asset. Words are identified, for example, by detecting additional horizontal "space" between characters.

One embodiment of a paragraphization algorithm is employed, in step 552, to extract "high-level" information regarding text assets, such as lines and paragraphs. The location/position information extracted in first pass 520, including character and word spacing information (from step 552) is utilized to determine where lines and paragraphs begin and end. Various algorithms can be employed to resolve this basic problem—i.e., identifying lines and paragraphs given "absolute location" information (e.g., spatial coordinates of characters and words employed by document formats such as PDF), and generating "relative location" information via line break, paragraph and other tags employed by the HTML 5 format.

In step 552, paragraph delimiters are identified to distinguish distinct paragraphs from one another. A typical paragraph "pattern" might consist of an indented first line. By detecting "lines" having similar "x coordinates," a consistently higher "x coordinate" indicates an indented line. Similarly, an occasional doubled "y coordinate" differential indicates another common paragraph "pattern" with a blank line delimiting paragraphs.

In addition to detecting delimiters to identify distinct paragraphs, paragraph "justifications" (e.g., left, center and right justifications) are also identified in step 552. For example, consistent "x coordinates" at the beginning (but not the end) of each line of a paragraph indicates a "left-justified" paragraph. Conversely, a "right-justified" paragraph exhibits consistent "x coordinates" at the end (but not the beginning) of each line of the paragraph. Finally, a consistent "x coordinate" differential between the beginning and end of each line of the paragraph indicates a "center-justified" paragraph.

The line spacing within (as well as between) paragraphs is discerned from "y coordinate" information, which is converted into appropriate HTML tags in step 554 to generate the appropriate line spacing. Lines and paragraphs detected in step 552 are also converted into HTML 5 (and CSS 3) in step 554 using respective line break ("<br>") and paragraph ("<p>") tags, among other text and layout-related attributes (such as the text-indent CSS property). In other embodiments, additional line and paragraph attributes can be detected, and additional HTML tags can be employed (via HTML Converter123 shown in FIG. 1*b*).

Having extracted the high-level line and paragraph information with respect to the text asset in step 552, and converted this "absolute location" information in step 554 into the "relative location" attributes of the HTML 5 and CSS 3 formats, control is returned to step 535 to determine whether any assets remain to be processed. If not, the converted document elements (along with existing non-document elements on the web page) are stored on the host server in step 580, awaiting access during runtime.

Otherwise, if a "font" asset is identified, the glyphs (i.e., "images" of the characters of the font) are extracted in step 560. As noted above, in one embodiment, only those glyphs that actually appear in the document are extracted (to save resources, such as memory and network bandwidth).

These glyphs are mapped in a font file to the unicode representations of the characters they represent. To access the font file from an HTML 5 web page, an @font-face CSS declaration is employed in the page style block for the font. This creates a custom font definition that can be used by a web browser as if the font were one of the browser's built-in fonts.

In step 562, various geometric transforms are computed, if necessary, for specially formatted text. For example, if diagonal text is employed, each of the characters used in the document is converted, in one embodiment, to a "rotated glyph" (using a simple geometric transform) and stored in a font file as a character of the custom font, mapped to its corresponding unicode representation. In this embodiment, the vertical positions of each character are also stored in the font file (mapped to the rotated glyphs and their unicode representations), reflecting the increasing or decreasing slope of successive characters. In other embodiments, information relating to the slope of the diagonal (and even to the rotation of each individual character) can be maintained independently of the individual characters themselves.

Diagonal text can be detected directly from within a PDF document by virtue of PDF support for rotated text. The presence of diagonal text may also be inferred from the absolute position data (e.g., periodically increasing or decreasing vertical coordinates of adjacent text characters) discerned from the document.

For other transforms, analogous adjustments are employed (in one embodiment, on a character-by-character basis). Apart from the information stored in the font file, accessible via the @font-face tag, related attributes can be encoded natively in the HTML 5 web page, such as character spacing, line-height, paragraphs, justification, etc.

Figure 1B:
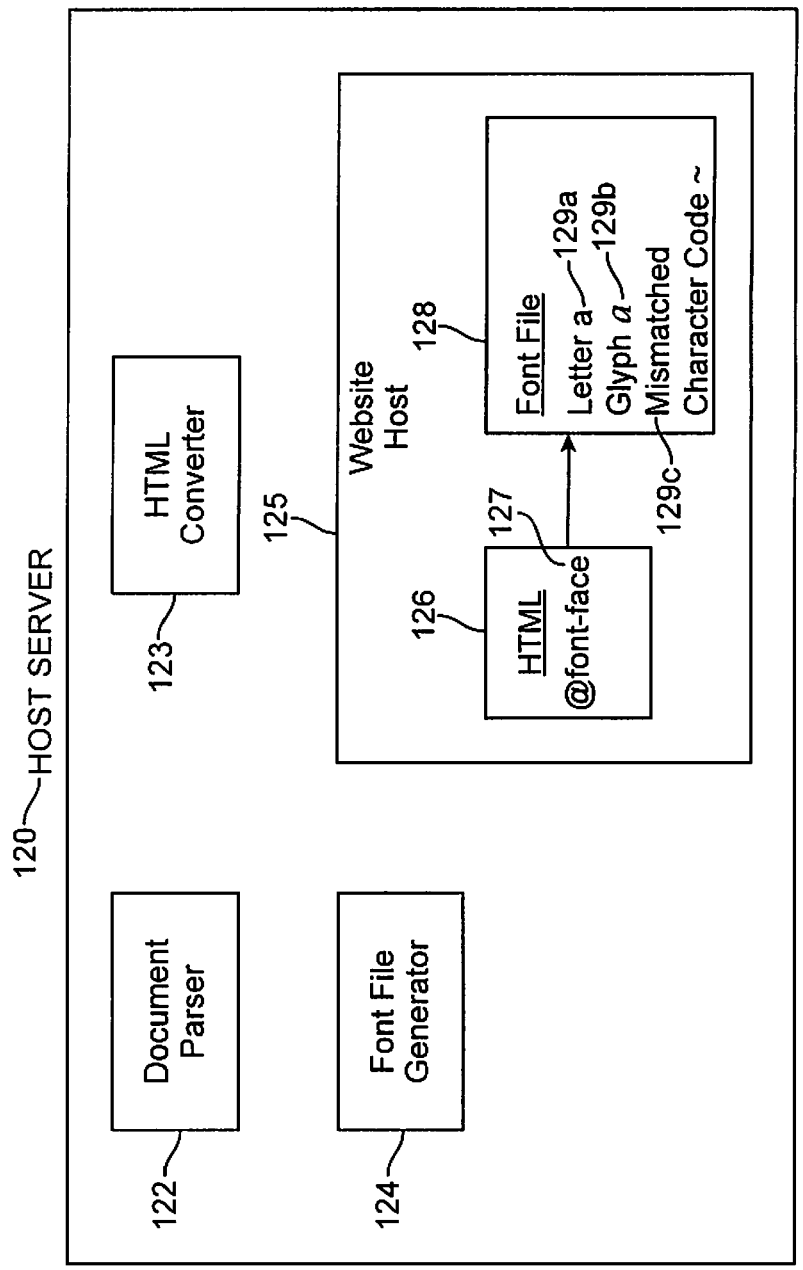
FIG. 1b is a block diagram of one embodiment of the host server component.

Before converting (in step 564) these transformed sets of characters into the appropriate web-readable formats, the characters can, in one embodiment, optionally be encrypted, in step 563 (as a form of HTML 5-compliant "digital rights management" or DRM), to prevent users from copying and pasting the "protected" text into other environments. Unlike the convoluted and easily circumvented methods currently employed to prevent the copying and pasting of text from within web pages (e.g., often relying upon custom Javascript), this solution leverages the @font-face mechanism (127 in HTML web page 126 shown in FIG. 1*b*) built into HTML 5 to map individual characters to alternative characters (e.g., a "tilde") that can be displayed in their place when a user attempts a copy and paste operation. In other words, rather than attempting to inhibit the copy and paste operation (as shown in FIG. 1*b*, with letter 129*a*, glyph 129*b* and mismatched code 129*c* in font file 128), it is allowed to proceed, but with substituted "encrypted" version of the actual characters.

Each glyph will still appear in the user's web browser as intended. But, it will also be mapped (on the host server, in one embodiment) to an alternative "gibberish" character (e.g., a tilde), that in turn will be mapped to the actual unicode character itself (e.g., the letter "a"). Thus, the actual unicode character will remain available, for example, if the user desires to conduct a text search. But, if the user attempts to copy and paste a block of text, the alternative characters will be substituted and, upon being pasted, will show up as "gibberish" characters (thus preventing the unauthorized transfer of such text to other environments).

It should be noted that, for maximum security, the mapping of the characters is confined to the host server, which can be invoked to generate the alternative characters when the user attempts to copy and paste the "encrypted" text (e.g., using a simple Javascript call in the source web page). In other embodiments, the mapping information can be contained within the files delivered to the user's web browser (avoiding the need to invoke the host for this purpose), though potentially compromising security in the event a third party is able to discern or disable this mapping process.

As noted above, PDF documents (among others) store fonts in a myriad of different formats (e.g., Type1, Type3, OpenType, etc.), which, to be usable as a web font, must be converted (e.g., into "eot," "ttf" and "svg" formats, accommodating different positions, encodings, transforms, etc.). To accommodate differences among individual web browsers (including those on embedded devices, such as mobile phones), multiple font files are employed to ensure @font-face support among the differing formats.

For example, in one embodiment, ".eot" formats are utilized for Internet Explorer, ".svg" formats for embedded devices and ".ttf" formats for Firefox, Safari, Chrome, etc. Thus, the @font-face CSS declaration for the "Zapfino" typeface might look like the following:

```
@font-face {
font-family: 'Zapfino';
src: url ('Zapfino.eot');
src: url ('zapfino/zapfino.svg') format ('svg');
src: local ('\u263a'), url ('Zapfino.otf') format ('truetype');
}
```

Whether or not geometrically transformed and/or optionally encrypted, the glyphs and the corresponding unicode characters to which they are mapped, are then converted, (via Font File Generator 124 shown in FIG. 1*b*) in step 564, into the various web-readable font file formats ("eot," "ttf" and "svg"), after which control is returned to step 535 to determine whether any assets remain to be processed. If not, the converted document elements (along with existing non-document elements on the web page) are stored on the host server in step 580, awaiting access during runtime.

It should be noted that, in other embodiments, the conversion of fonts into the various web-readable formats in step 564 can be performed at the end of second pass 530 after all text, font and image assets have been parsed (as opposed to converting each font asset as it is parsed).

Finally, if an "image" asset is identified, and the image is a "vector graphic" image, then it is rasterized (i.e., converted into a "bitmap" image) in step 570. In other embodiments, vector graphics can be supported directly supported in HTML. Then, in step 572, graphic layers are merged. As noted above, the "z order" of multi-layer objects (e.g., bitmaps on text on vector graphics, along with vector fills, gradient patterns, clip polygons, etc.) must be preserved while generating a simpler HTML-friendly structure (e.g., text on background image).

In one embodiment, a boolean bitmap is maintained to facilitate the determination of whether particular page assets (bitmaps, text, vector graphics, etc.) share display space (in which case, for example, clipping is necessary to generate a merged bitmapped image). The boolean bitmap identifies the regions of a page that have currently been "drawn" (processed), and thus which pixels need to be checked for overlap against the current asset being processed.

In one embodiment, two boolean bitmaps are maintained—one for tracking the area currently occupied by the next bitmap (or rasterized vector graphic) being added to the display stack, and the other for tracking the area occupied by text objects. Until there exists overlap between these two boolean bitmaps, the order in which they are drawn makes no difference.

In this manner, the two boolean bitmaps are refined in step 572 as each asset is processed, until a "final" background image is generated (taking into account any previously overlapping text) on top of which the "final" text layer is placed. It should be noted that, where white space exists between image assets, the image is split into separate files in step 574. And, in step 576, the image may need to be scaled, converted or otherwise reformatted, depending upon its original format and the size and position information previously extracted. In other embodiments, step 574 and 576 can (like step 564) be performed at the end of second pass 530 after all text, font and image assets have been parsed (as opposed to splitting files and reformatting each image asset as it is parsed).

Finally, control is returned to step 535 to determine whether any assets remain to be processed. Once all text, font and image assets have been processed, the converted document elements (along with existing non-document elements on the web page) are stored (via Website Host 125 shown in FIG. 1*b*) on the host server in step 580, awaiting access during runtime.

When accessed by a client web browser during runtime, the document and non-document elements (including the insertion of ads that may change dynamically) are loaded on the host server in step 585 and delivered to the client web browser, where they are integrated and rendered, in step 590, on the client computer.

B. Automatic Sharing of Reading-Related Activities Across External Social Networks As alluded to above, in one embodiment of the present invention, users of a website engage in various reading-related activities with respect to documents hosted on the website, regardless of whether such documents have been converted so as to retain the appearance of the original document (as discussed in Section A above). These reading-related activities include reading, annotating, rating or downloading (as well as uploading) documents. Note that, in other embodiments, various other activities could be included and shared, such as the particular page or portion within a document that a user is reading, the number of pages read or even the time spent reading a particular document). In one embodiment, Moreover, activities beyond those that are reading-related, could be shared with external social networks in a similar fashion to that described herein.

Figure 6:
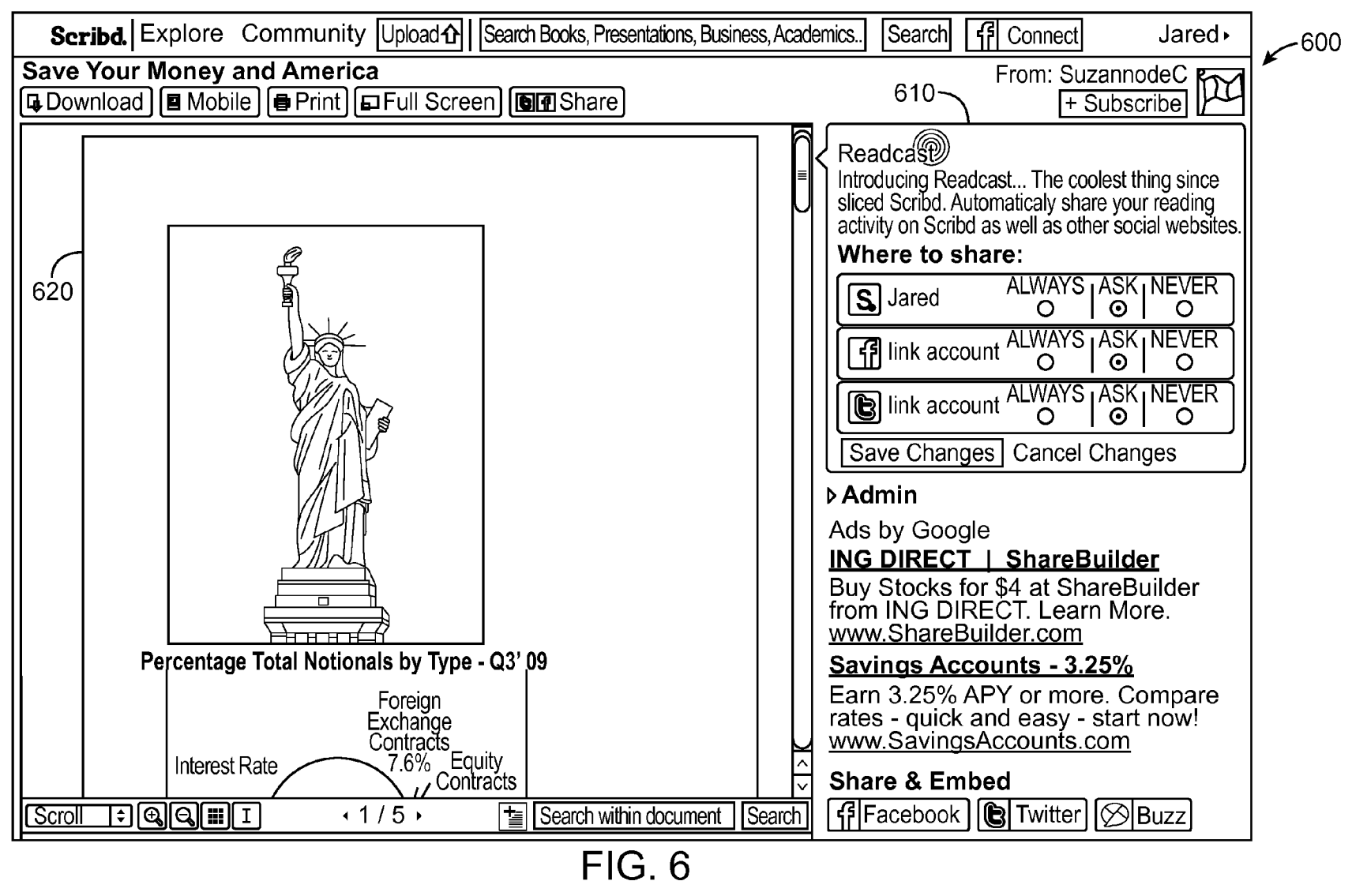

FIG. 6 illustrates an embodiment of an initial "ReadCast" dialog box 610 next to a document 620 displayed on a web page 600. While a user's intent in accessing web page 600 is to read document 620 and engage in various other reading-relating activities, this dialog box 610 presents the user with an opportunity to set certain "passive sharing" preferences (not shown) that will result in the automatic sharing of the user's future reading-related activities with desired members of the user's external social networks. For example, after setting these preferences, the user might select a particular document, causing the system to automatically notify the user's Facebook friends (in accordance with the user's specified preferences) that the user has elected to read that particular document. In another embodiment (not shown), whenever a user reads a document, a list of all users who have read the document is displayed next to the document.

Figure 7A:
FIG. 7a is a screenshot illustrating a user's "ReadCast" settings for a set of "passive sharing" preference controls displayed on a web page in one embodiment of the present invention.

One embodiment of these "ReadCast" settings is illustrated in FIG. 7*a*, which includes various preference controls 700 covering activities such as "Reading" 702 a document, "Downloading" 704 the document (or sending it to the user's mobile phone via the "Send to Mobile" activity 706), "Rating" 708 the document and "Scribbling" 710 (i.e., annotating the document). In addition, the user specifies, with respect to various social networks 715 (e.g., Facebook 716, Twitter 717 and the Scribd website's own "internal" social network 718), whether each of the activities is shared (by specifying, for each activity, "always" share, "never" share, or "ask" the user at the time of engaging in the activity whether to share such action with the specified social networks).

For example, in FIG. 7*a*, the user has enabled all activities 700 and selected the "ask" radio button for each of them (with the exception of the Scribd social network, for which Rating and Scribbling can only be set to always be shared). Thus, when the user reads a particular document (or rates, annotates, downloads or sends the document to the user's mobile phone), the system will automatically ask the user whether to share such information with the user's specified social network (e.g., Facebook friends or Twitter followers).

FIG. 7*b* illustrates alternative ReadCast settings. For example, the "Send to Mobile" 706 and "Scribbling" 710 activities have been disabled by the user, and the "Reading" 702 activity is set to "always" be shared on Scribd 718 and "never" be shared on Facebook 716, while the Rating activity is set to "always" be shared on Facebook 716 and Twitter 717.

Figure 8:
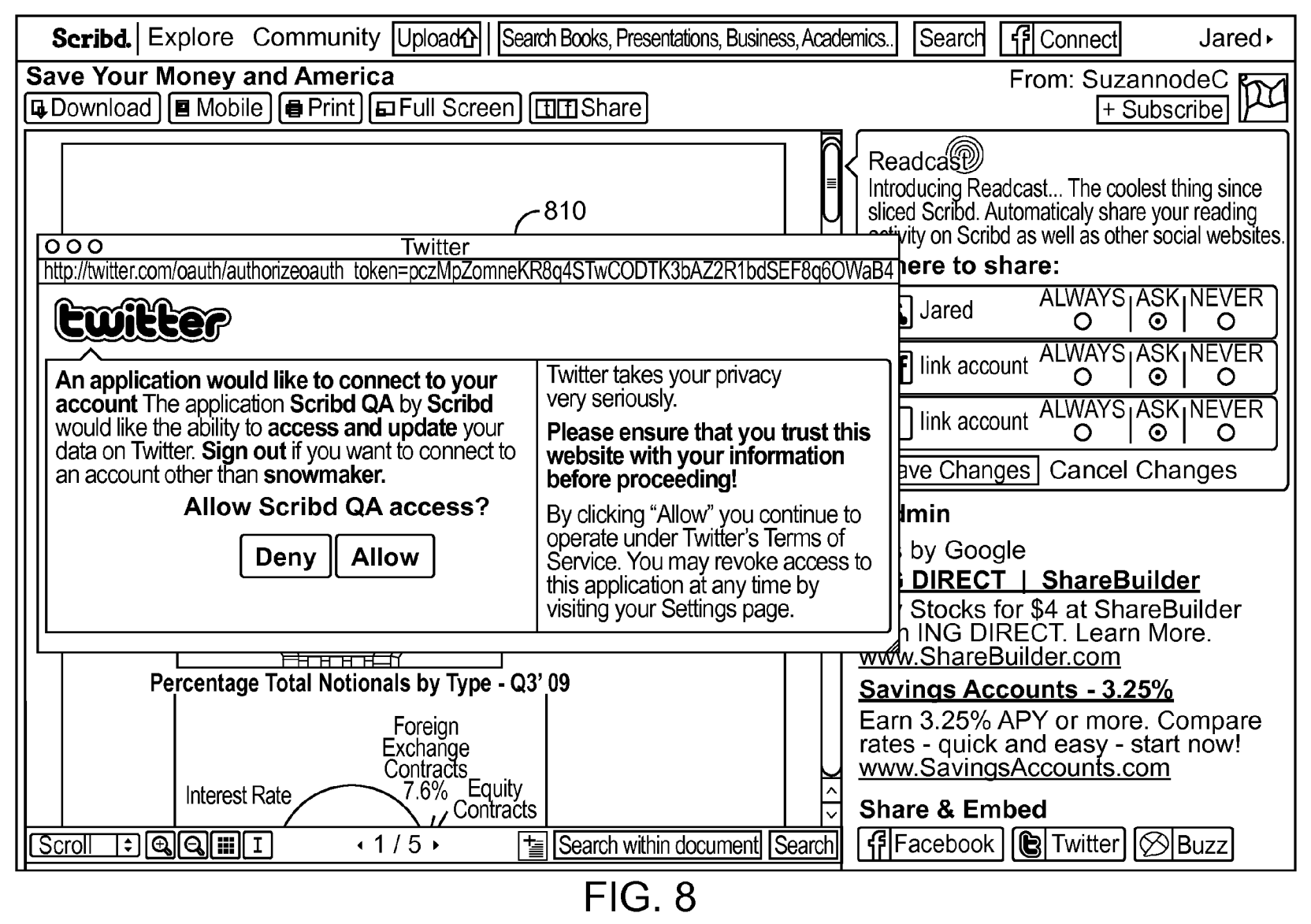

FIGS. 7*a* and 7*b* also include a "Link to Account" button 720 to enable the user to designate and access their particular Facebook or Twitter account. FIG. 8 illustrates a Twitter dialog box 810 that is invoked when the user selects the "Link to Account" button under the Twitter column. This dialog box 810 provides the user with the opportunity (i.e., an additional layer of security provided by the social networking site) to allow or deny the host website access to the user's Twitter account (e.g., to share the user's designated activities on the Scribd website with the user's Twitter account).

Figure 9:
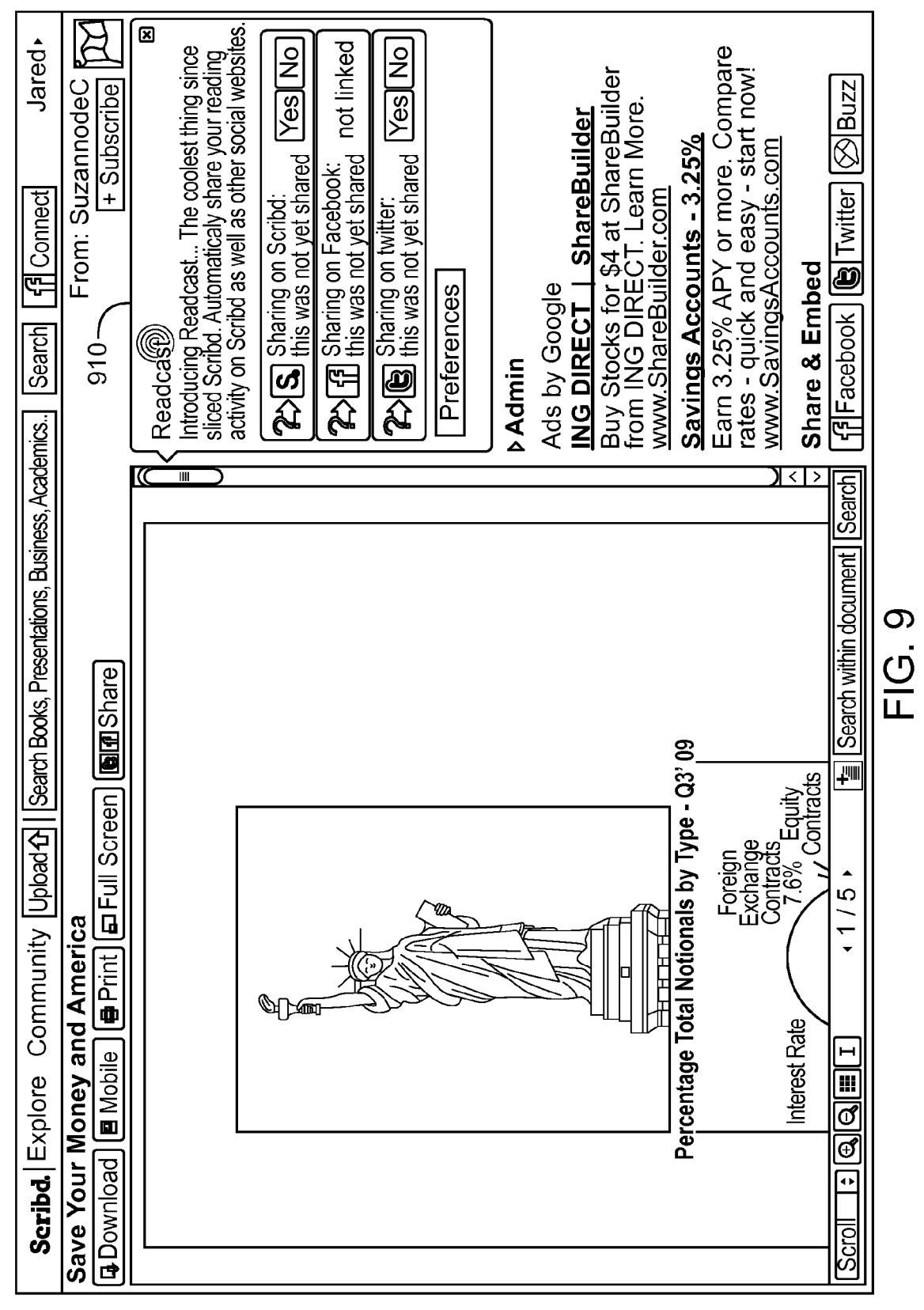

After completing the designation of the desired ReadCast preferences, the user selects the "Save Changes" button 730 (shown in FIGS. 7*a* and 7*b*), which results (in one embodiment) in the dialog box 910 illustrated in FIG. 9. This dialog box 910 summarizes the user's selected preferences (e.g., indicating the social network(s) on which the user's activities are shared). In other embodiments, the specific activities that are enabled can be displayed.

Once these ReadCast "passive sharing" preference settings have been saved, whenever the user performs one of the designated activities on the host website, a notification indicating that the user has performed that activity will be shared on the user's designated social networks (e.g., Facebook or Twitter, as well as the host Scribd network) without requiring any further action by the user.

In another embodiment, a list of a user's "friends" or other contacts on external social networks is identified and maintained, and ReadCast notifications to anyone on that list are forwarded to the user's Scribd friends, thereby further extending such notifications to a social "network of networks" or a "social Internet." This is accomplished by using the APIs provided by external social networks (e.g., "Facebook Connect") to copy and retain a portion of the user's "social graph" or a list of friends. Once the user's social graph is copied to the social network within the host website, specific activities can be shared with that user's social network without further interaction with external social networks or services.

Figure 10:
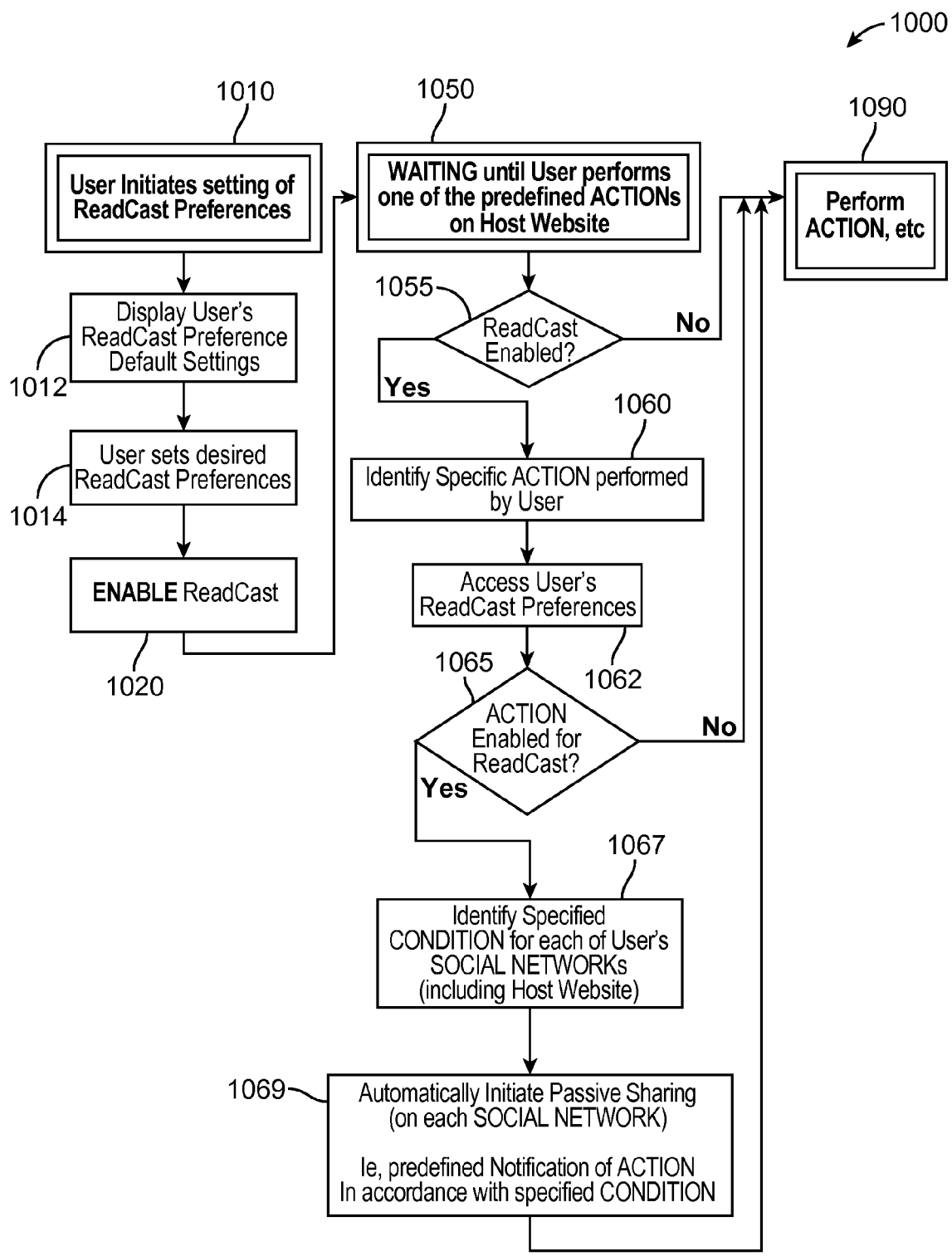
FIG. 10 is a flowchart illustrating a passive sharing process in accordance with one embodiment of the present invention, including the setting of a user's ReadCasting preferences and the automatic sharing (in accordance with those preferences) of the user's actions on a host website with the user's external social networks.

A more detailed description of one embodiment of the passive sharing process is illustrated by the flowchart in FIG. 10. As discussed above, a user initially encounters on the host website (e.g., via dialog box 610 shown in FIG. 6) an opportunity to set initial ReadCast settings, represented by step 1010 in FIG. 10. The system 1000 then displays, in step 1012, the user's default ReadCast settings. The user then sets desired preferences in step 1014, by associating particular activities with specified social networks, as explained above with respect to FIGS. 7*a* and 7*b*. Upon initially saving those preferences (which, in one embodiment, the user can revise at any time), system 1000 enables, in step 1020, the ReadCast passive sharing behaviors.

As users perform various reading-related activities on the host website, system 1000 detects, in step 1050, a user's performance of one of the predefined actions, and checks, in step 1055, to determine whether that user's ReadCast settings are enabled. If that user's ReadCast settings are not enabled, system 1000 simply permits the user to continue performing the desired reading-related activity (step 1090).

Otherwise, system 1000 identifies, in step 1060, the particular activity being performed by the user and accesses, in step 1062, the user's ReadCast preferences to determine, in step 1065, whether the user's ReadCast settings are enabled for that particular activity. If not, system 1000 (as above) permits the user to continue performing the desired reading-related activity (step 1090).

If the user's ReadCast settings are enabled for that particular activity, then system 1000 identifies, in step 1067, the conditions under which the activity will be "passively shared" with the user's specified social networks. For example, as noted above with respect to FIGS. 7(*a*) and 7(*b*), the user may have enabled that activity to always be shared with certain social networks and never be shared with others (and perhaps to be asked at the time whether to share the activity with certain other social networks). Of course, in other embodiments, additional options and conditions could be specified.

Finally, to the extent a particular activity (e.g., reading a particular article on the host website) has been designated to be shared with one or more of the user's social networks, then system 1000 proceeds, in step 1069, to initiate the "passive sharing" of that activity—e.g., to notify one or more of the user's designated social networks that the user has engaged in that particular activity. System 1000 (as above) then permits the user to continue performing the desired reading-related activity (step 1090).

It should be emphasized that various modifications and combinations of the above-described embodiments can be employed without departing from the spirit of the present invention.

The invention claimed is:

1. A method for converting non-HTML documents into HTML, and integrating the converted documents into existing HTML web pages on a host server while preserving the original appearance and text searchability of the documents, the method including the following steps:
   (a) parsing a document to extract text characters and associated fonts, each glyph in a font representing the appearance of its associated text character with respect to that font, as well as page layout attributes of the document, including individual words, lines and paragraphs;
   (b) converting the extracted text characters, fonts and page layout attributes into an intermediate format, and integrating the converted text characters, fonts and page layout attributes into an existing HTML web page, employing @font-face tags to integrate the extracted text characters and generating HTML tags to preserve the document's page layout attributes, including the extracted words, lines and paragraphs, wherein the existing HTML web page includes a first set of a plurality of advertisements each of which is positioned to be displayed in between two corresponding pages of the document;
   (c) generating one or more font files, accessible via the @font-face tags in the HTML web page, that map the text characters to their associated glyphs; and
   (d) storing the HTML web page and font files on the host server for delivery to and rendering within the window of a client web browser, wherein:
      (i) the original appearance and text searchability of the document is preserved; and
      (ii) when the client web browser's standard controls (as opposed to custom controls that are document-specific or not built into standard web browsers) are employed to scroll among the pages of the document, the elements of the existing HTML web page into which the document has been integrated are thereby also scrolled, and each of the plurality of advertisements is displayed in between its corresponding pages of the document.

2. The method of claim 1 where the @font-face tag is employed to link the font files to the HTML web page.

3. The method of claim 1 wherein the HTML web page contains a plurality of web page elements external to the document, and wherein the document and the plurality of web page elements are displayed within the client's web browser window.

4. The method of claim 1 wherein a user of the client's web browser selects and searches for text within the document using the client web browser's standard controls.

5. The method of claim 1 further comprises a second set of a plurality of advertisements located to the side of respective corresponding pages of the document, whereby the ad inventory of the web page, comprising the first set and second set of the plurality of advertisements, is proportional to the number of pages of the document.

6. The method of claim 1 wherein the font files include, for each text character, a mismatched character code that does not correspond to the character's associated glyph, and wherein the HTML web page contains the mismatched character codes and instructions directing the web browser to use the font files for displaying the glyphs, whereby the web browser utilizes the font files to display the text characters correctly, but cannot search for or copy the text characters due to the mismatched character codes in the HTML web page.

7. The method of claim 1 wherein the page layout attributes of at least some portion of the document are specified in the HTML web page by the organization of the text characters into words, lines and paragraphs, and wherein the page layout attributes are preserved by:
   (a) extracting from the document absolute position information relating to the text characters;
   (b) analyzing the absolute position information to identify relative position information, including the beginning and end of individual words, lines of text and paragraphs of text; and
   (c) generating HTML tags, from the relative position information, to delineate the beginning and end of individual lines of text and paragraphs of text.

8. The method of claim 1 wherein the page layout attributes of the document include diagonal text, and wherein the page layout attributes are preserved by:
   (a) detecting the presence of diagonal text while parsing the document;
   (b) generating, via a geometric transformation, a rotated glyph corresponding to each text character of the diagonal text; and
   (c) mapping, to each rotated glyph, vertical position information that enables the client's web browser to render the diagonal text.

9. The method of claim 8 wherein the presence of diagonal text is detected by extracting from the document absolute position information relating to the text characters, and identifying periodically increasing or decreasing vertical offsets of adjacent text characters.

10. A system that converts non-HTML documents into HTML, and integrates the converted documents into existing HTML web pages on a host server while preserving the original appearance and text searchability of the documents, the system comprising:

(a) a document parser, embodied in a non-transitory computer-readable medium on the host server, that extracts text characters and associated fonts, each glyph in a font representing the appearance of its associated text character with respect to that font, as well as page layout attributes of the document, including individual words, lines and paragraphs;

(b) an HTML converter, embodied in a non-transitory computer-readable medium on the host server, that converts the extracted text characters, fonts and page layout attributes into an intermediate format, and integrates the converted text characters, fonts and page layout attributes into an existing HTML web page, employing @font-face tags to integrate the extracted text characters and generating HTML tags to preserve the document's page layout attributes, including the extracted words, lines and paragraphs, wherein the existing HTML web page includes a first set of a plurality of advertisements each of which is positioned to be displayed in between two corresponding pages of the document;

(c) a font file generator, embodied in a non-transitory computer-readable medium on the host server, that generates one or more font files, accessible via the @font-face tags in the HTML web page, that map the text characters to their associated glyphs; and (d) a website host, embodied in a non-transitory computer-readable medium on the host server, that stores the HTML web page and font files for delivery to and rendering within the window of a client web browser, wherein:

(i) the original appearance and text searchability of the document is preserved; and (ii) when the client web browser's standard controls (as opposed to custom controls that are document-specific or not built into standard web browsers) are employed to scroll among the pages of the document, the elements of the existing HTML web page into which the document has been integrated are thereby also scrolled, and each of the plurality of advertisements is displayed in between its corresponding pages of the document.

11. The system of claim 10 where the @font-face tag is employed to link the font files to the HTML web page.

12. The system of claim 10 wherein the HTML web page contains a plurality of web page elements external to the document, and wherein the document and the plurality of web page elements are displayed within the client's web browser window.

13. The system of claim 10 wherein a user of the client's web browser selects and searches for text within the document using the client web browser's standard controls.

14. The system of claim 10 further comprises a second set of a plurality of advertisements located to the side of respective corresponding pages of the document, whereby the ad inventory of the web page, comprising the first set and second set of the plurality of advertisements, is proportional to the number of pages of the document.

* * * * *